H. E. ALTGELT.
WHEEL OPERATED LIFT MECHANISM.
APPLICATION FILED APR. 10, 1920.
1,378,754.
Patented May 17, 1921.
2 SHEETS—SHEET 1.
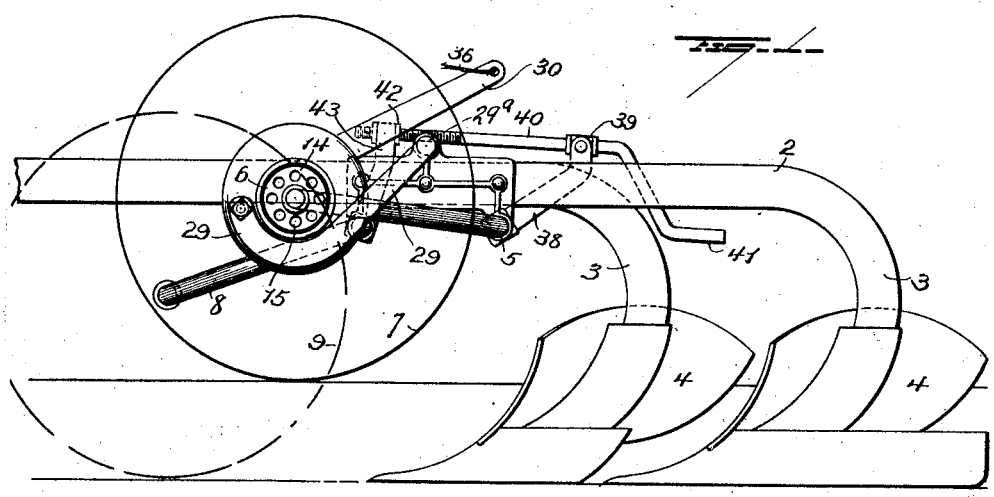
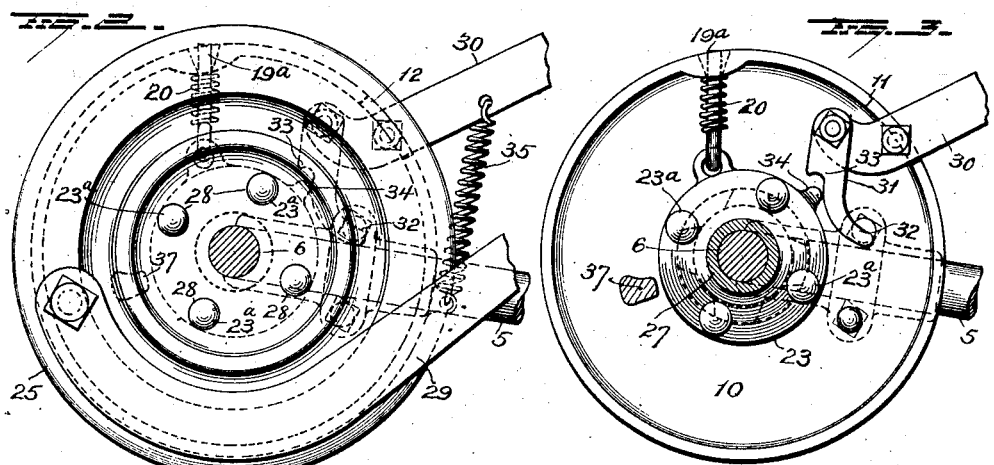
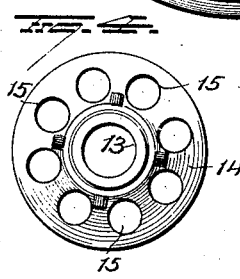
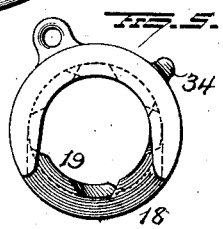
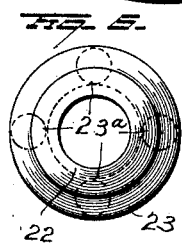
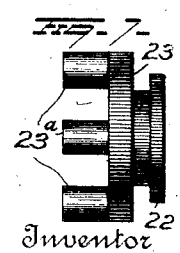
Inventor
H. E. Altgelt
By Seymour & Bright
Attorneys

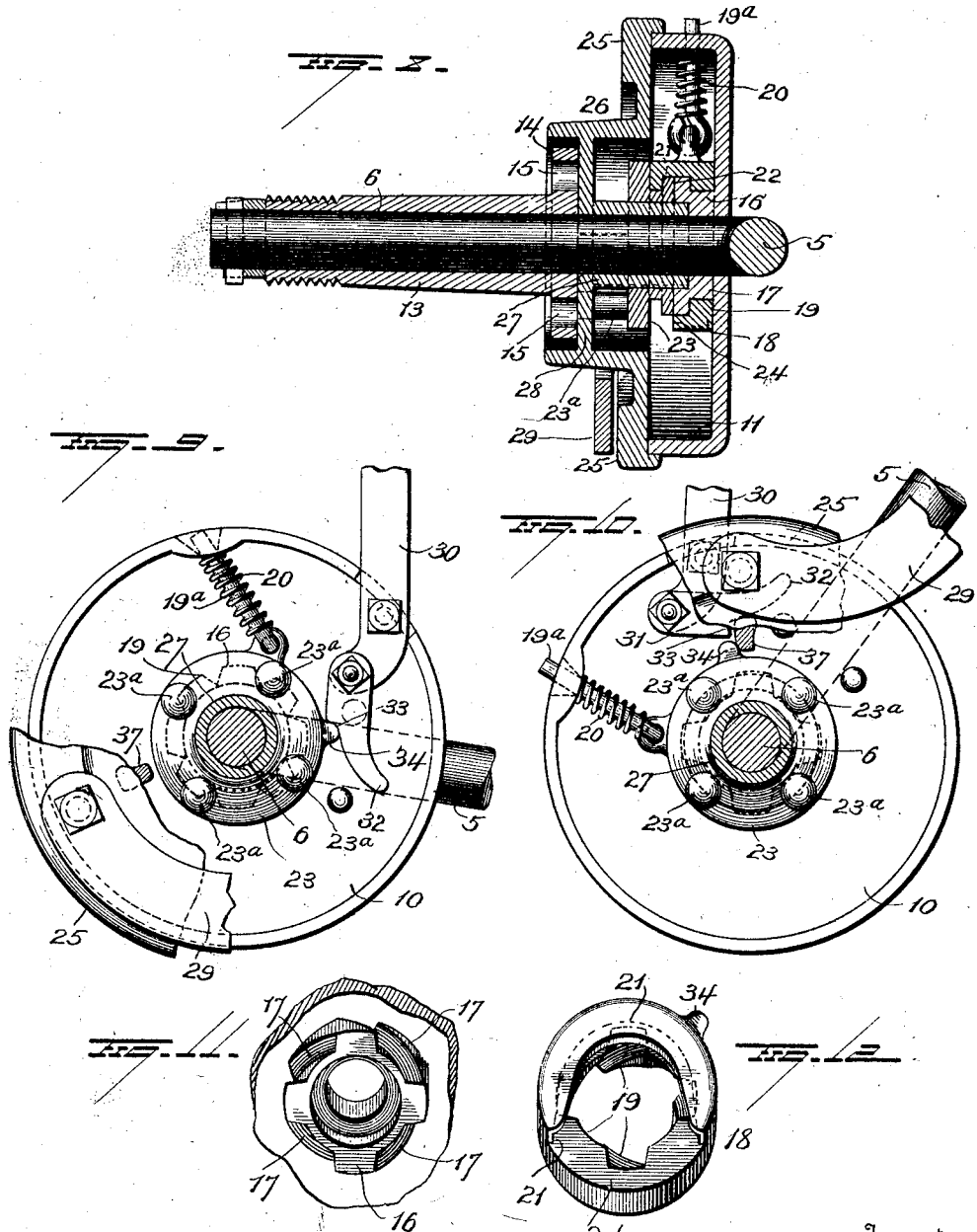

UNITED STATES PATENT OFFICE.

HERMAN E. ALTGELT, OF NEW BRAUNFELS, TEXAS, ASSIGNOR TO OLIVER CHILLED PLOW WORKS, OF SOUTH BEND, INDIANA.

WHEEL-OPERATED LIFT MECHANISM.

1,378,754.   Specification of Letters Patent.   Patented May 17, 1921.

Original application filed April 5, 1919, Serial No. 287,756. Divided and this application filed April 10, 1920. Serial No. 372,795.

*To all whom it may concern:*

Be it known that I, HERMAN E. ALTGELT, a citizen of the United States, and a resident of New Braunfels, in the county of Comal and State of Texas, have invented certain new and useful Improvements in Wheel-Operated Lift Mechanism; and I do hereby declare the following to be a full, clear, and exact description of the invention, such as will enable others skilled in the art to which it appertains to make and use the same.

This invention relates to improvements in wheel operated lift mechanism for agricultural implements and more particularly to means for connecting the lifting mechanism with a ground wheel and disconnecting it therefrom,—this application being a division of application for patent filed by me on the 5th day of April, 1919, and designated by Serial No. 287,756.

One object of my present invention is to provide simple and efficient mechanism for connecting the part to be raised or actuated, such as the frame of a wheeled agricultural implement, with driving means, such as a ground wheel of an agricultural implement.

A further object is to construct mechanism of the character specified that the driven member may move alternately in opposite directions, while the driving member is moving forwardly; so that the driven member may be automatically disconnected from the driving means and held in locked position and so that the driven member may be released from locked position and permitted to turn.

With these and other objects in view, the invention consists in certain novel features of construction and combinations of parts as hereinafter set forth and pointed out in the claims.

In the accompanying drawings; Figure 1 is a side elevation of a wheeled plow showing an application of my improvements; Figs. 2 and 3 are enlarged views showing the positions of the parts of the lifting mechanism when the implement is at work; Fig. 4 is a view of the wheel box and its perforated flange; Figs. 5, 6 and 7 are detail views of the devices for coupling the lifting disk with a carrying wheel of the implement; Fig. 8 is a sectional view showing the means for coupling the lifting disk with a carrying wheel and uncoupling the same therefrom; Fig. 9 is a view partly in section and partly broken away, showing the positions of the parts at the beginning of the lifting operation; Fig. 10 is a similar view showing the positions of the parts when the implement shall have been lifted, and Figs. 11 and 12 are detail views showing the cam members which control the coupling and uncoupling of the lifting disk relatively to the carrying wheel.

In the drawings I have represented a plow frame 1 which may comprise in the structure illustrated, two beams 2, 3 suitably spaced apart and bracked, and to each of these beams, a plow base 4 may be secured. Any suitable means may be provided for connecting the forward end of the plow frame with draft means, such as a tractor (not shown). The horizontal member of a crank axle 5 is mounted transversely on the plow frame and the spindle portion 6 at the free end of the crank of said axle is mounted in the hub of a carrying wheel 7. Another crank axle 8 mounted on the plow frame has its spindle portion mounted in the hub of a carrying wheel 9. The axles may be connected so as to move together.

A housing 10 is rigidly secured to the axle 5 approximately at the juncture of the spindle portion with the crank arm thereof, and this housing may comprise a circular disk having a peripheral flange 11, the latter being notched, as at 12, for a purpose hereinafter explained. The spindle portion 6 of axle 5 passes through the housing 10 and through a wheel box 13 secured within the hub of the wheel 7,—said wheel box being provided at its inner end with an annular flange 14 having a plurality of holes 15 for a purpose hereinafter explained.

Rigid with the inner face of the housing 10 and concentric with the hole therein through which the axle spindle passes, is a hub 16 having an annular series of spiral grooves 17 and encircling this hub is a ring 18 having therein an annular series of spiral ribs 19 to enter the spiral grooves of the hub 16. The spiral grooves and ribs form cams between the housing 10 and the ring 18, so that when the ring is turned, it will be caused also to move in a direction parallel with its axis. A rod 19$^a$ is pivotally connected with the ring 18 and is movably connected with the housing 10. A spring 20 encircles the rod 19ª and has bearings at its respective ends so that when the ring 18 is turned, it will be retained, by the action of said spring, in the position to which it may be moved.

I have referred to the spiral grooves and ribs of the hub 16 and ring 18, as forming cams between the housing and ring, but it will be apparent that the construction is such that, in the embodiment of the invention shown in the drawing, the connection between the ring 18 and the housing is, in effect, a screw threaded connection.

The ring 18 is made interiorly with a groove 21, in which an annular flange 22 on a ring 23 is rotatively mounted, said ring 18 being also made with a cut-away portion 24 to permit the assembling of said rings.

A disk 25 is mounted loosely on the spindle portion 6 of the axle 5 and is disposed in close proximity to the housing 10, said disk having a recessed enlargement 26 and a hub 27, the latter serving as a mounting for the disk upon the axle spindle. When the parts are assembled, the hub 27 enters the rings 18 and 23, and the latter are adapted, during the operation of the mechanism, to enter the recessed enlargement 26 of the disk. The recessed enlargement 26 is made with a plurality of holes 28 (four such holes being shown in the drawing) through which, pins 23ª on the ring 23 pass,—said pins being also adapted to be caused to pass through the holes 15 in the flange 14 of the wheel box 13, to connect the disk with the carrying wheel 7. The ring 23 with the pins 23ª thus constitute a locking member for connecting the disk and carrying wheel.

A lifting arm 29 extends downwardly from a shaft 29ª mounted transversely on the plow frame. The lower portion of said lifting arm is disposed outside of the disk 25 (between said disk and the wheel 7) and is curved forwardly under the central recessed enlargement 26 of said disk, its lower end being pivotally attached to said disk at a point which is located forwardly of the axis of the axle spindle and the disk when the plow is in working position, as shown in Fig. 1.

A control lever 30 is pivotally mounted on the housing 10 and passes through the notched portion 12 thereof. The short arm of this lever enters the housing and has pivoted thereto, a gravity dog 31 having a tongue 32 and also a tooth 33, the latter being intended to engage a rib or shoulder 34 on the periphery of the ring 18. The control lever is maintained normally in and returned to normal position by the action of a spring 35, attached at one end to said lever and at the other end to the housing 10. To the free end of the control lever, an operating cord 36 is attached. The disk 25 is provided with an inwardly projecting lug 37 adapted to coöperate with the rib or shoulder 34 on the ring 18, for a purpose hereinafter explained.

When the plow is in working position, the parts will assume the positions shown in Fig. 1, with the connection of the lifting arm to the disk 23 (which may be termed the lifting disk) located approximately in front of the axis of said disk when the plow is set for deep plowing.

Let it be now assumed that it is desired to raise the implement. The operator will pull the cord 36 to move the control lever forwardly. This will cause the dog 31 to move rearwardly and, by engagement with the rib or shoulder 34, cause the ring 18 to be turned. As the ring 18 is thus turned, its cam or screw connection with the hub 16 of the housing 10, will cause said ring 18 to move outwardly, carrying the ring 23 with it and causing the pins 23ª to enter the holes 15 in the flange of the wheel box 13. The rings 18 and 23 will be held in these positions to the action of the spring 20. The lifting disk 25 will now be in locked connection with the wheel box and therefore with the wheel 7 and as the plow moves forwardly, the disk 25 will rotate with the wheel 7 and motion will be imparted through the lifting arm 29 to the plow frame to raise the plows. During such raising operation, the pivotal connection of the lifting arm with the lifting disk will move from the position shown in Fig. 1 and the lifting action will extend throughout approximately three-fourths of a rotation of the disk 25 and the wheel 7, thereby enhancing the efficiency of the lifting mechanism to raise the plow to its full height during a long continued and gradual application of power derived from the carrying wheel. During the raising of the plow, the cranks of the axles will move from the positions shown in Fig. 1 to the positions shown in Fig. 10 and as the pivotal connection of the lifting arm with the lifting disk approaches a position slightly past a dead center over and with relation to the axis of said disk, the lug 37 on the disk 25 will engage the tongue 32 of dog 31. raise the latter and engage the rib or shoulder 34 on the ring 18, thus causing the latter to be turned (overcoming the resistance of the spring 20) and causing said ring to move inwardly by the action of the cam or screw connection with the housing and thus the pins 32ª on the ring 23 to be withdrawn from engagement with the wheel box. The implement will now be held in its raised position and the carrying wheel 7 will be free to rotate on the axle spindle. To lower the plow, the operator will again move the control lever forwardly. Such operation of the control lever will cause the dog 31 to engage the lug 37 on the disk and turn said disk sufficiently to move the pivotal connection of the lifting-arm with said disk past the dead center, when the plow will descend by gravity and the disk turn to the normal position which it assumes when the plow is at work as shown in Fig. 1.

Having fully described my invention what I claim as new and desire to secure by Letters Patent, is:—

1. In mechanism of the character described, the combination with an axle, and a wheel, of a cam member secured to the axle, a second cam member coöperable with said first-mentioned cam member, a lifting member loose on the axle, means connected with said second cam member and coöperable with said lifting member and with the wheel to lock said lifting member to the wheel, means for operating said second cam member to lock the lifting member to the wheel, means operable automatically to release the lifting member from the wheel, and means operating to hold said second cam member in the position to which it may be moved.

2. In mechanism of the character described, the combination with an axle, and a wheel, of a housing member secured to the axle, a ring having a screw connection with said housing member, a disk loose on the axle, a locking member connected with said ring for locking the disk to the wheel, a control lever mounted on said housing member, and a dog attached to said control lever and coöperable with said ring for turning the same to effect locking connection of said disk and wheel.

3. In mechanism of the character described, the combination with an axle, and a wheel, of a housing member secured to the axle, a disk loose on the axle, a cam member carried by said housing member, a ring having cams to coöperate with said cam member, a locking member revolubly connected with said ring and coöperable with the disk and wheel, a control lever mounted on the housing member, a dog attached to said lever, and a shoulder on said ring to be engaged by said dog.

4. In mechanism of the character described, the combination with a part to be raised, an axle, and a wheel, of a housing member secured to the axle, a ring having a screw connection with said housing member, a disk loose on the axle, a locking member connected with said ring for locking the disk to the wheel, a lifting connection between said disk and the part to be lifted, a control lever mounted on said housing member, and a dog attached to said control lever and coöperable with said ring for turning the same to effect locking connection of said disk and wheel, said dog having a tongue, and a lug on the disk to engage said tongue and lift the dog and to engage the shoulder on said ring to turn the latter and effect the unlocking of the disk from the wheel.

5. In mechanism of the character described, the combination with a part to be raised, an axle, and a wheel, of a housing member secured to the axle, a perforated disk loose on the axle, a connection between said disk and the part to be raised, a perforated member carried by the wheel, a ring having a cam connection with said housing member, a locking member revolubly connected with said ring and having pins to pass through perforations of the disk and enter the perforated member carried by the wheel, a control lever, means operable by said control lever to turn said ring in one direction to lock the disk to the wheel, means controlled by the disk for turning the ring in the reverse direction to effect the unlocking of the disk from the wheel, and a spring device for retaining the ring in the position to which it may be moved.

6. In mechanism of the character described, the combination with a part to be raised, an axle, and a wheel, of a disk loose on the axle, cam-operated locking means for connecting said disk with the wheel, an arm connecting said disk with the part to be raised whereby the latter will be raised when the disk turns in one direction until the connection of said arm with the disk approximately passes a dead center over the axis of said disk, a control lever, a dog operated by said lever for operating said locking means, and means on the disk for unlocking said locking means, said dog being also coöperable with said disk for moving the same until the connection between said arm and disk moves backwardly past said dead center to permit the part to be raised to descend by gravity.

In testimony whereof I have signed this specification in the presence of two subscribing witnesses.

HERMAN E. ALTGELT.

Witnesses:
J. KATHRYN BOUDINARD,
CHAS. A. WEBSTER.